United States Patent [19]

Brininstool et al.

[11] Patent Number: 5,073,711

[45] Date of Patent: Dec. 17, 1991

[54] FIBER-OPTIC REMOTE ANGULAR POSITION SENSOR INCLUDING A POLARIZATION TRACK

[75] Inventors: Michael R. Brininstool, La Jolla, Calif.; Jeffrey T. Newmaster, Pittsburgh, Pa.; Steven L. Garrett, Carmel, Calif.

[73] Assignee: The United States of America as represented by the Secretary of the Navy, Washington, D.C.

[21] Appl. No.: 583,778

[22] Filed: Sep. 17, 1990

[51] Int. Cl.[5] .............................................. G01D 5/30
[52] U.S. Cl. ............................... 250/231.18; 250/225; 250/227.21; 356/375
[58] Field of Search ...................... 250/231.18, 231.13, 250/225, 227.21; 356/375

[56] References Cited

U.S. PATENT DOCUMENTS 4,577,414 3/1986 Migliori et al. .................. 33/363 K

OTHER PUBLICATIONS

"Thesis": Methods of Remote Optical Angle Measurement with Compass Applications, by Newmaster, Thomas, Naval Post Graduate School, Monterey, CA, Sep. 1987.
"Fiber Optic Sensors Offer Advantages for Aircraft", Lewis, Norris, Optical Engineering Reports, Jun. 1987.
Varshneya, D. Maida, J. L., and Hakman E. D., "Fiber Optic and Laser Sensors V", De Paula and Udd, ed., Proc SPIE, 838 (1987).

Primary Examiner—David C. Nelms
Assistant Examiner—T. Davenport
Attorney, Agent, or Firm—Harvey Fendelman; Thomas Glenn Keough; Michael A. Kagan

[57] ABSTRACT

A sensor for remotely detecting an angular position of a shaft rotatable within a frame includes: first means for generating collimated first, second, third, and polarized optical beams; second means positioned proximate to the first means for receiving and combining the first, second, third, and polarized optical beams into a composite optical beam having an intensity; and a code wheel fixedly mounted to the shaft and interposed between the first and second means. The code wheel includes first, second, and third channel mask patterns and a first polarizing filter positioned to transect the first, second, third, and polarized optical beams, respectively. Interaction between the code wheel and the light beams results in the composite light beam being encoded such that the angular position of the wheel is functionally related to the intensity of the composite opitical beam. The sensor further includes third means operably coupled to receive the composite optical beam for providing an output corresponding to the angular position of the code wheel.

14 Claims, 5 Drawing Sheets

FIBER-OPTIC REMOTE ANGULAR POSITION SENSOR INCLUDING A POLARIZATION TRACK

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention described herein is generally related to angular position sensors that use optical encoding to determine angular position.

Many applications require an angular orientation position sensor which can be read from a distant location. Such applications include industrial process controls and remotely piloted vehicles. Monitoring the angular position of a tool is necessary in many robotic system applications.

One type of remote angle sensor that utilizes polarized optical signals to convey information regarding angular position is described by Migliori, et al in U.S. Pat. No. 4,577,414. In that device, a light beam is split into two inner channel beams and two outer channel beams. The inner channel beams pass through fixed linear polarization filters that are aligned orthogonally to each other. The polarized inner channel beams then pass through a linear polarization filter mounted on a rotatable wheel. The two outer channel beams are directed to fall incident upon concentric semicircular masks printed on the code wheel.

Analog amplitude information is encoded onto the two inner channel beams as the linearly polarized light beams pass through the polarization filter on the code wheel. The only light transmitted through the polarizing filter on the code wheel is linearly polarized at an angle $\theta$ with respect to the angle of the code wheel polarization filter ($\pm 180$ degrees). The intensity of the beam transmitted through the polarization filter is proportional to $\sin^2\theta$ and $\cos^2\theta$ due to orthogonal orientation of the fixed filters. Letting A equal the intensity of the beam proportional to $I_0\sin^2\theta$ and B equal the intensity of the beam proportional to $I_0\cos^2\theta$ where $I_0$ equals the maximum intensity of the beams, the ratio of A to B is equal to $\tan^2\theta$. Therefore:

$$\theta = \tan^{-1}[(A/B)]^{\frac{1}{2}} \quad (1)$$

Because both channels are energized by a single light source, the effect of fluctuations in source intensity are eliminated when the ratio A/B is formed. Since light intensity is always a positive quantity, $\theta$ is always between 0 and 90 degrees. Normalization of the two inner channel intensities is necessary due to differences in the peak intensities of the channels caused by differences in separation between the inner channels, optical path lengths, coupling losses, and electrical component characteristics of these channels. Thus, the Migliori device requires circuitry to store, compare, and update the differences in signal intensities for both inner, analog channels.

Equation 1 assumes both analog inner channels have the same maximum and minimum values. To compensate for the difference in maximum beam intensity between the two analog channels, Migliori modifies Equation 1 so that:

$$\theta = \tan^{-1}[\{(A \times B_{max})/(B \times A_{max})\}^{\frac{1}{2}}] \quad (2)$$

Using the trigonometric identity the angle, $\theta$, can also be determined from:

$$\cos 2\theta = A/A_{max} - B/B_{max}$$

or:

$$\theta = 1/2\cos^{-1}[A/A_{max} - B/B_{max}] \quad (3)$$

The two outer channels of the Migliori device provide quadrant ambiguity and are encoded with either "on" or "off" signals depending on the position of the masks on the code wheel relative to the incident outer channel beams. This encoding provides information necessary to determine the position of the code wheel within a quadrant, i.e., 0-90 degrees, 90-180 degrees, 180-270 degrees, or 270-360 degrees.

All four channel beams leave the sensor and are each propagated through separate optical fibers to detector circuitry so that the encoded beams can be processed to provide an output directly in degrees or radians.

Thus, a need exists for a remote angle sensor with a single return channel to bring the encoded signal back to the processing electronics in order to provide a simpler, more compact, and less expensive sensor having greater reliability over present sensors of this type.

SUMMARY OF THE INVENTION

The present invention provides a sensor for remotely detecting an angular position of a shaft rotatable within a frame includes: first means for generating collimated first, second, third, and polarized optical beams; second means positioned proximate to the first means for receiving and combining the first, second, third, and polarized optical beams into a composite optical beam having an intensity; and a code wheel fixedly mounted to the shaft and interposed between the first and second means. The code wheel is shaped as a disc and includes first, second, and third channel mask patterns and a first polarizing filter positioned to transect the first, second, third, and polarized optical beams, respectively. Interaction between the code wheel and the light beams results in the composite light beam encoded such that the angular position of the wheel is functionally related to the intensity of the composite optical beam. The sensor further includes third means operably coupled to receive the composite optical beam for providing an output corresponding to the angular position of the code wheel.

An important feature of the invention is the configuration of the channel mask patterns of the code wheel because the sensor combines all four mask channels into a single composite beam, thereby simplifying the receiver electronics and reducing the number of fiber channels. The first, second, and third channel mask patterns and the first polarizing filter are concentric with respect to the wheel. The first channel mask pattern is a ring-shaped area comprising a transparent arcuate segment area extending +270 degrees from a reference axis, and a 90 degree opaque arcuate segment. The second channel mask pattern is a ring-shaped area comprising a 180 degree transparent arcuate segment extending +180 degrees from the reference axis, and a 180 degree opaque arcuate segment. The third channel mask pattern is a ring-shaped area comprising a 90 degree transparent arcuate segment extending +90 degrees from the reference axis, and a 270 degree opaque circular segmented area.

An important advantage of the present invention is that it remotely detects angular position without the necessity of coupling electrical conduits to the remote sensor. Another advantage of the present invention is that it provides a remote angular position sensor having resolution of one part in $10^3$ of 90 degrees, or roughly 0.1 degrees. A further advantage of the invention is that it is a single channel device.

DESCRIPTION OF THE PREFERRED EMBODIMENT

Figure 1:
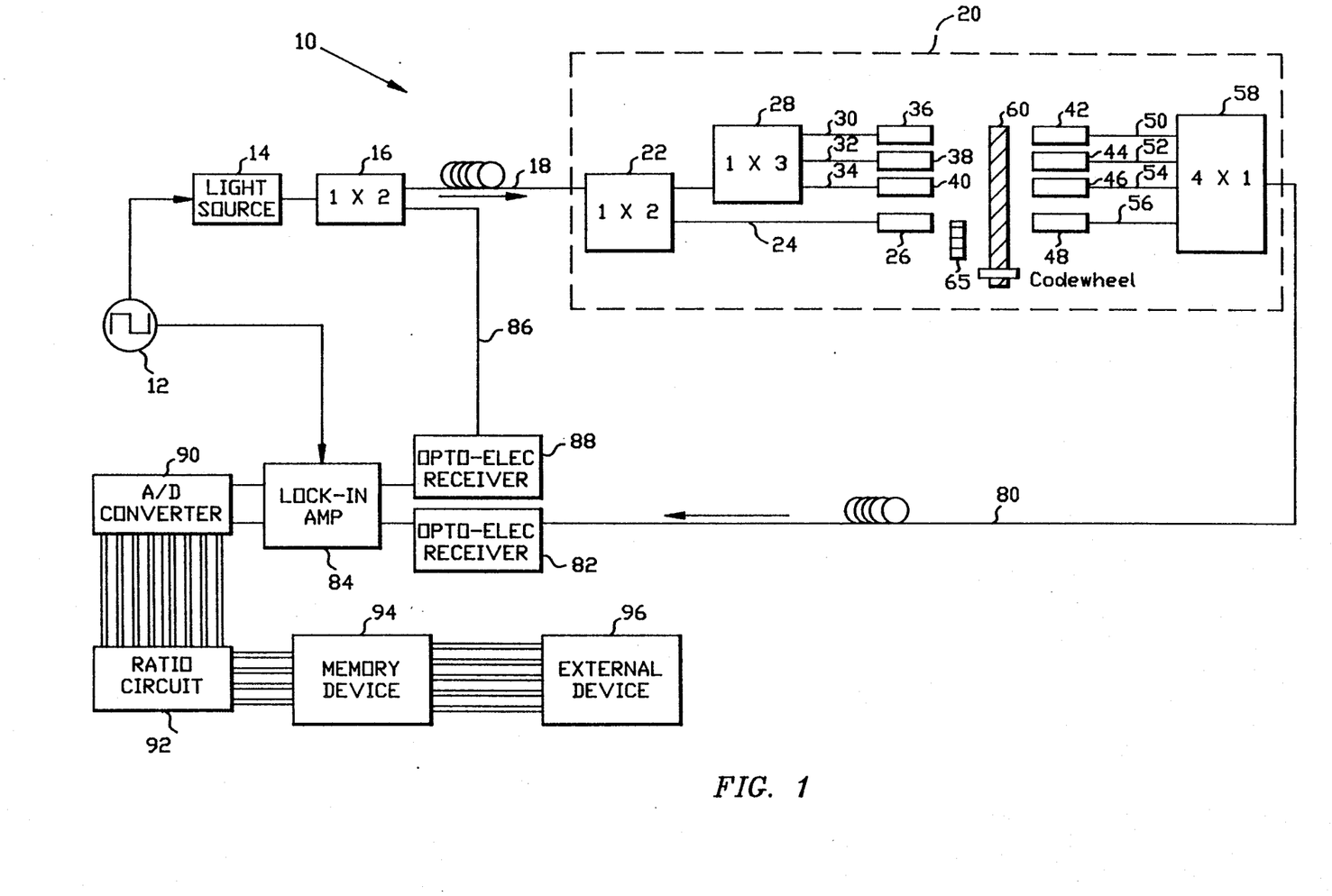
FIG. 1 is a block diagram of a first embodiment of the present invention.

Referring to FIG. 1, there is depicted a block diagram of a remote fiber optic angular position sensor 10 of the present invention which is shown to include signal generator 12 which provides a square wave signal, which also serves as a modulation reference signal, to drive light source 14, such as a light emitting diode. Light source 14 provides an output having a waveform corresponding to the waveform of the signal provided by signal generator 12. By way of example, light source 14 may be a light emitting diode, although the scope of the invention also comprehends the employment of other types of light sources such as laser diodes. The output of light source 14 is preferably a square wave, although other waveforms, such as a sine wave may also be used. The output of light source 14 is directed to 1×2 optical coupler 16. One of the outputs of optical coupler 16 is propagated via optical waveguide 18 to remote sensor body 20.

Sensor body 20 includes 1×2 optical coupler 22 which receives the optical signal provided by optical waveguide 18. One output of optical coupler 22 is directed via optical waveguide 24 to ¼ pitch graded refractive index rod lens 26. The other output of optical coupler 22 is coupled to 1×3 optical coupler 28 having three outputs directed via optical waveguides 30, 32, and 34 to ¼ pitch graded refractive index rod lenses 36, 38, and 40, respectively. The light signals output by rod lenses 36, 38, 40, and 26 are separately received by ¼ pitch graded refractive index rod lenses 42, 44, 46, and 48, respectively, which are optically coupled via optical waveguides 50, 52, 54, and 56, respectively to 4×1 optical coupler 58.

Fiber optic couplers suitable for use in the present invention are available from CANSTAR, 3900 Victoria Park Ave. North York, Ontario, M2H 3H7 Canada. For example, couplers 16, and 22 may be CANSTAR Type MC3. Couplers 28 and 58 may be CANSTAR Type SCS 4×4.

Figure 2:
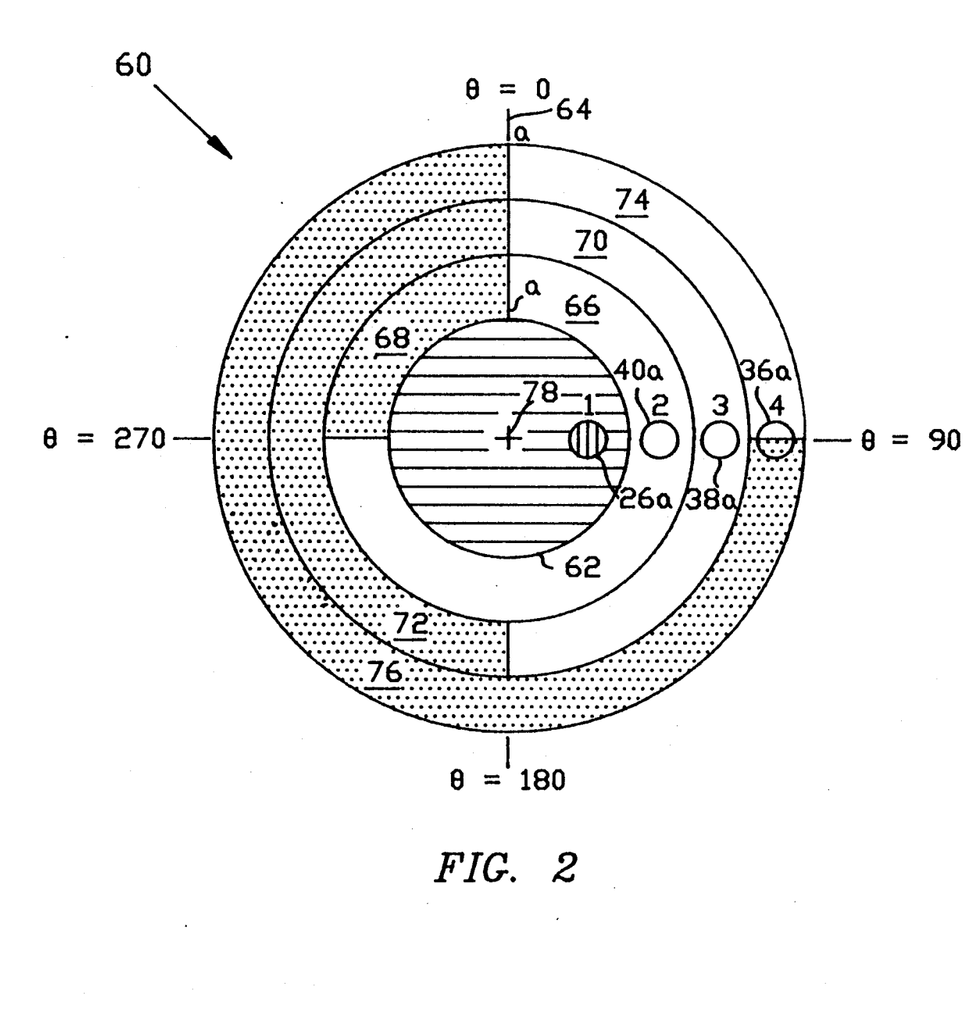
FIG. 2 is a plan view of the code wheel.

Rotatable code wheel 60 is interposed between rod lens pairs 36 and 42, 38 and 44, 40 and 46, and, 26 and 48 so as to transect the light signals propagating therebetween with three discrete channel mask patterns and an analog polarization channel described below with reference to FIG. 2. The regions of code wheel 60 interrogated by these light signals are: area 26a by rod lens 26, area 40a by rod lens 40, area 38a by rod lens 38, and area 36a by rod lens 36. Code wheel 60 includes polarization filter 62 which has its polarization axis perpendicular to the 0 degree reference axis 64, as shown in FIG. 2, where axis 64 is fixed with respect to rotatable code wheel 60. The intensity of light passing through filter 62 is proportional to $\cos^2\theta$, where $\theta$ is the angle between the polarization axis of filter 62 and the reference axis 64. The light signal emanating from rod lens 26 is transected by fixed polarization filter 65 and then filter 62. If the light signal passes through filter 62 and 65, it is received by rod lens 48, and said to be "analog" encoded. The polarization axis of filter 65 is parallel to reference axis 64 and the polarization axis of filter 62 is perpendicular to reference axis 64 when code wheel 60 is in the "zero" degree angular displacement position.

Figure 3:
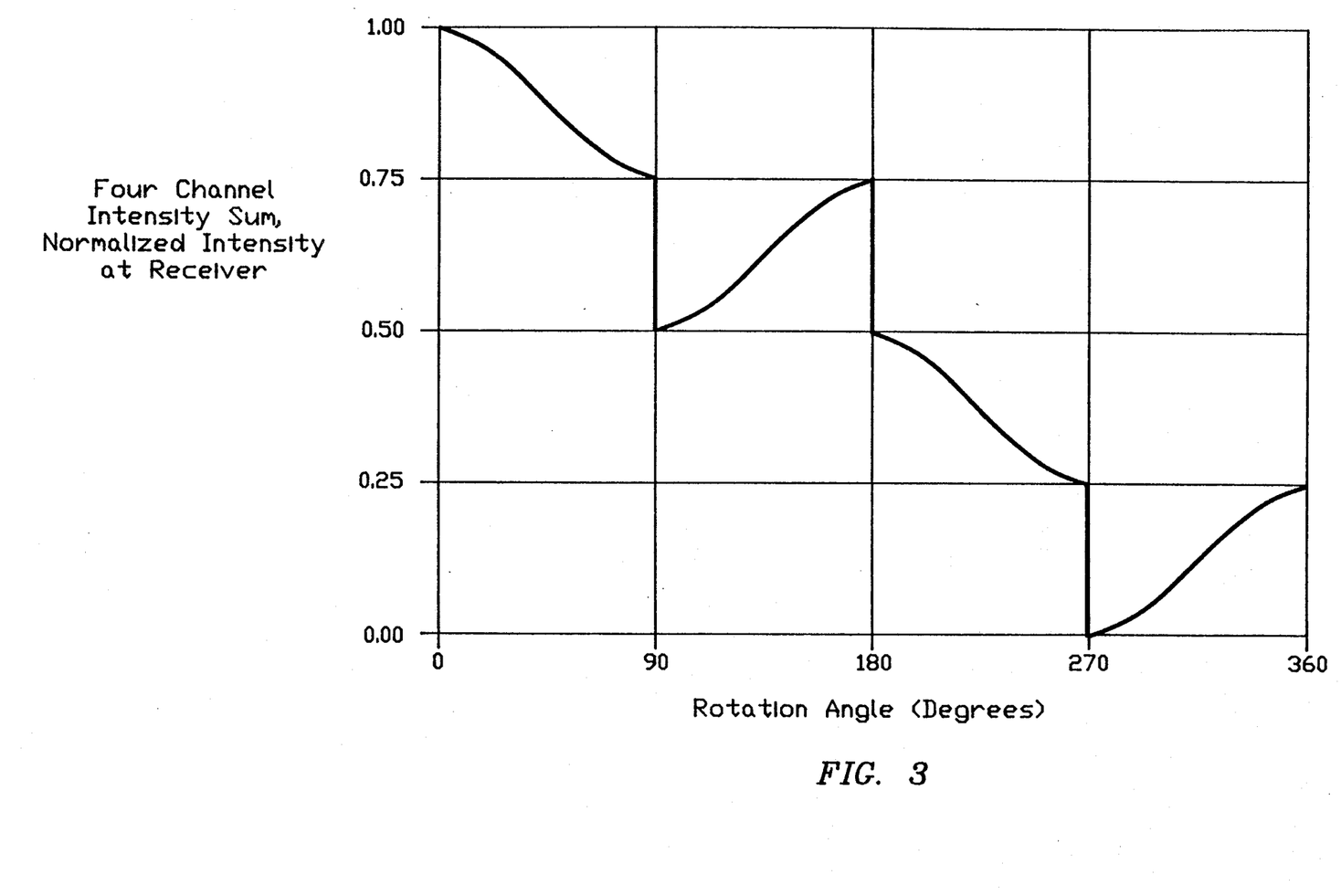
FIG. 3 is a graph illustrating the relationship between the normalized intensity of the sensor output and the angular position of the code wheel.

Code wheel 60 also includes three "discrete" channels. The first discrete channel is a ring-shaped area that includes transparent arcuate area 66 extending 270 degrees from reference axis 64, and opaque arcuate area 68 extending from −90 degrees from reference line a—a, which rotates in conjunction with code wheel 60. The second discrete channel is a ring-shaped area that includes transparent arcuate area 70 extending 180 degrees from reference line a—a, and opaque arcuate area 72 extending from −180 degrees from reference line a—a. The third discrete channel is a ring-shaped area that includes transparent arcuate area 74 extending 90 degrees from reference line a—a, and opaque arcuate area 76 extending −270 degrees from reference line a—a. All arcuate areas 66, 68, 70, 72, 74, and 76 are concentric with the center 78 of code wheel 60. Light transected by these discrete channels either passes through the transparent areas of mask pattern to be received by appropriate rod lenses 42, 44, 46, and 48, or is blocked by the opaque areas. In this way, the light signals provided by lenses 42, 44, and 46 are discretely "encoded" with "on" or "off" levels which uniquely affect the overall intensity of the composite light beam produced by optical coupler 58 which combines the light beams provided by lenses 42, 44, 46, and 48. Superimposed onto the discretely encoded light signals is the polarized light beam received by refractive lens 48. A graph illustrating the functional relationship between the intensity of the composite light beam and the position of code wheel 60 is presented in FIG. 3.

The optical output of optical coupler 58 propagates out of sensor body 20 through optical waveguide 80 and is received by opto-electronic receiver 82. Opto-electronic receiver 82 provides an output to lock-in amplifier 84 which is an electrical analog of the output of coupler 58. An example of a suitable lock-in amplifier is Model AD640, an integrated circuit, manufactured by Analog Devices. The second output of optical coupler 16 propagates through optical waveguide 86 to opto-electronic receiver 88. Lock-in amplifier 84 also receives the output of opto-electronic receiver 88 which is the electrical analog of the output of coupler 16. Lock-in amplifier 84 receives the modulation reference signal from signal generator 12 and provides a two-channel output, synchronized to the modulation reference signal, to analog-to-digital (A/D) converter 90 which converts the analog inputs from lock-in amplifier 84 into digital outputs that are received by ratio circuit 92. This synchronization provides noise immunity for the signal and improves its signal-to-noise ratio. Ratio circuit 92 divides the digitized representation of the output of optical coupler 58, $D_1$, by the digitized representation of the output of optical coupler 16, $D_2$, in order to normalize the output of ratio circuit 92 to compensate for intensity fluctuations attributable to the modulated output of light source 14. Because the accuracy of the angle output of the present invention is very sensitive to intensity fluctuations of light source 14, the function of ratio 92 is very important because it eliminates the problem of intensity fluctuations.

Light source 14 and opto-electronic receivers 82 and 88 are available as a matched set, an example of which is FIBERLINK XA/RA-1200, manufactured by Math Associates, Westbury, N.Y. The outputs of ratio circuit 92 are "addresses" functionally related to the intensity of the output of optical coupler 58 that are provided to a memory storage device 96, such as a PROM or ROM, in accordance with the relations described further herein. An example of a suitable PROM is Model No. $\mu$ PB 429 2,048×8-Bit Bipolar TTL PROM manufactured by NEC Electronics Corporation. Values stored in the addresses of memory device 94 correspond to various angular positions of code wheel 60, which may be output to an external device 94 such as a digital data processor or a display.

The light signals received by rod lenses 42, 44, 46, and 48 are combined by optical coupler 58 into a composite beam having an intensity described by the relation:

$$I_T = I_1 + I_2 + I_3 + I_4$$

where
- $I_T$ = the summation of the intensities of light output of coupler 58;
- $I_1$ = the intensity of the light output provided by rod lens 48 at the output of coupler 58;
- $I_2$ = the intensity of the light provided by rod lens 46 at the output of coupler 58;
- $I_3$ = the intensity of the light provided by rod lens 44 at the output of coupler 58;
- $I_4$ = the intensity of the light provided by rod lens 42 at the output of coupler 58;
- $\theta$ = the angle between the polarization axes of filters 65 and 62;

and where, if letting the maximum intensity ratio of the output of ratio circuit 92 be equal to 1, then:

| | |
|---|---|
| $I_1$ = | $0.25\cos^2\theta$ at all angles of $\theta$ |
| $I_2$ = | 0 from 0 to $-90$ degrees |
| = | .25 from 0 to 270 degrees |
| $I_3$ = | 0 from 0 to $-180$ degrees |
| = | .25 from 0 to 180 degrees |
| $I_4$ = | 0 from 0 to $-270$ degrees |
| = | .25 from 0 to 90 degrees |

Figure 4:
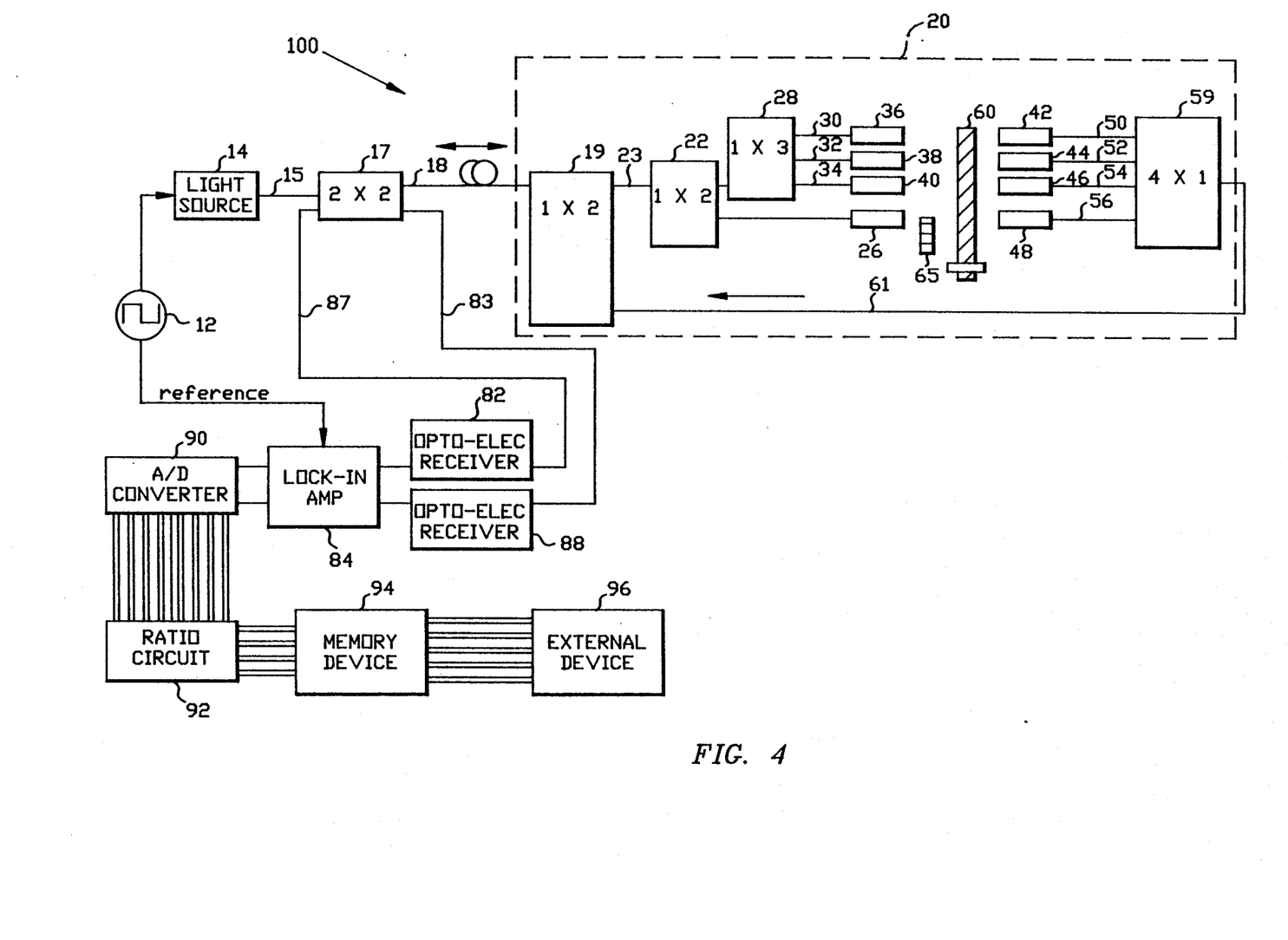
FIG. 4 is a block diagram of a second embodiment of the present invention.

A second embodiment of the present invention is described below and differs from the first embodiment depicted in FIG. 1 in that rather than requiring two optical waveguides 18 and 80 be coupled to sensor body 20, the second embodiment requires that only one optical waveguide be coupled to sensor body 20. Referring to FIG. 4, the output of light source 14 is provided to 2×2 optical coupler 17 via optical waveguide 15, and then is directed to 1×2 optical coupler 19 via optical waveguide 18 and to opto-electronic receiver 82 via optical waveguide 83. The combined light signal which comprises the output of coupler 19 is provided to coupler 22 through optical waveguide 23. The light signals received by rod lenses 42, 44, 46, and 48 are combined by coupler 59 and are propagated through optical waveguide 61 back to coupler 19. This combined light signal is directed through optical waveguide 18 to coupler 17, and then through optical waveguide 87 to opto-electronic receiver 88. Ratio circuit 92 divides the digital representation of the composite optical signal by the digital representation of the intensity reference signal provided to opto-electronic receiver 82. In all other respects, the operation and construction of remote angle sensor 100 shown in FIG. 4 is identical to that of remote angle sensor 10 depicted in FIG. 1.

It is to be noted that ambiguities in the position of code wheel 60 would ordinarily exist at 0, 90, 180, and 270 degrees because the intensities of the composite beam at 90 and 180 degrees are equal, and the intensities at 270 and 360 (0) degrees are equal. These ambiguities may be overcome through suitable software programming which monitors the incremental angular positions of code wheel 60 and selects only the solution to the ambiguity that is physically possible. For example, if the penultimate position of code wheel 60 is 89 or 91 degrees, and if the code wheel 60 then rotates to the 90 degree position, the programming will identify the position of code wheel 60 as being 90 rather than 180 degrees. Likewise, if the next to the last position of code wheel 60 is 269 or 271 degrees, and if the next position of code wheel 60 is 270 degrees, the software will identify the angular position of code wheel 60 as being 270 rather than 360 (0) degrees. Software programming to accomplish this process is well within the ordinary level of skill of one who practices in this field of technology.

Figure 5:
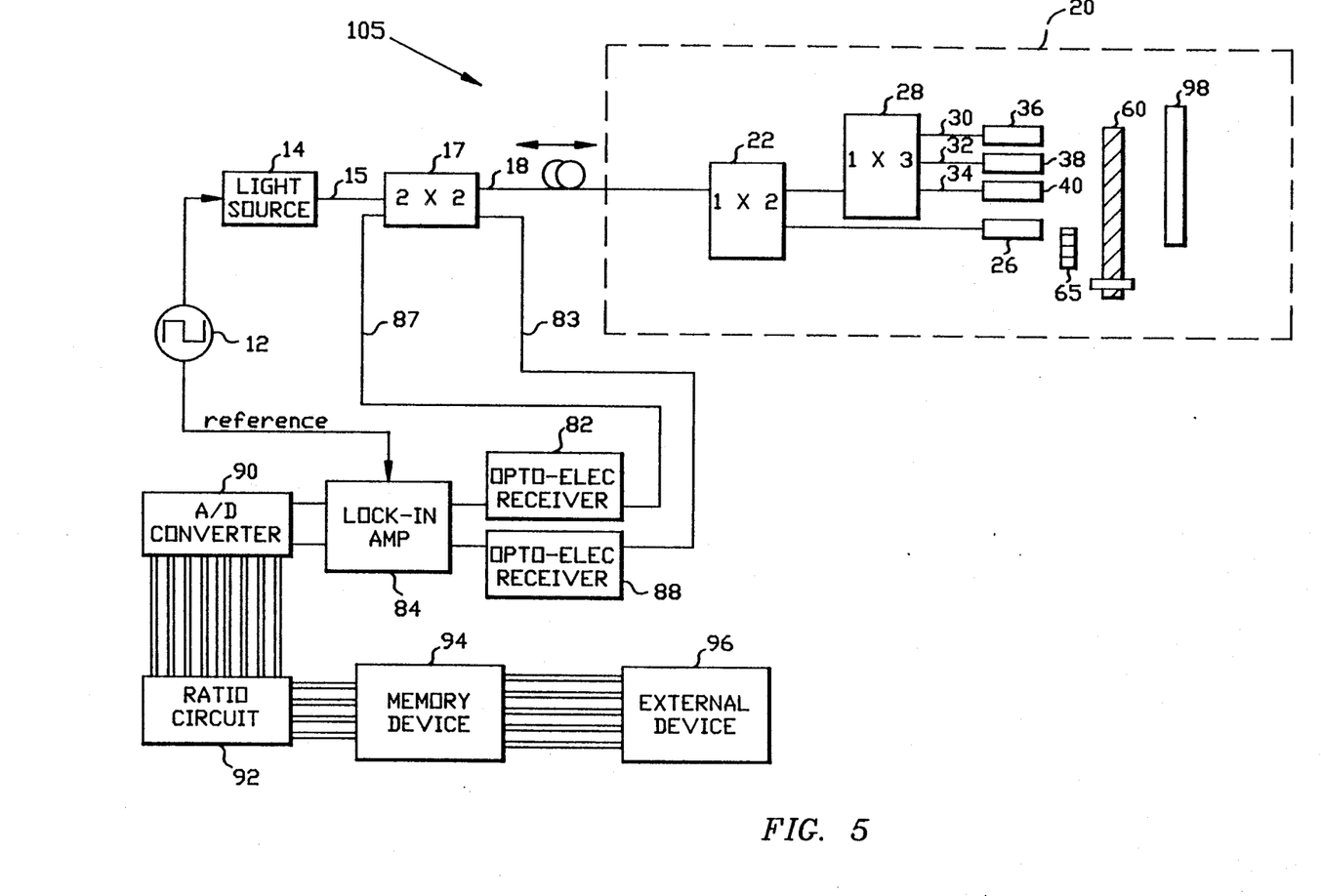
FIG. 5 is a block diagram of a third embodiment of the present invention.

A third embodiment of the present invention, sensor 105, is illustrated in FIG. 5. Sensor 105 is similar to sensor 100, presented in FIG. 4, except With sensor 105, mirror 98 reflects any light provided by lenses 26, 36, 38, and 40, through code wheel 60 back through these lenses. Thus, sensor 105 eliminates the need for lenses 42, 44, 46, and 48; couplers 19 and 59; and waveguides 23 and 61.

Obviously, many modifications of the present invention are possible in light of the above teachings. It is therefore to be understood that within the scope of the appended claims, the invention may be practiced otherwise than as specifically described.

We claim:

1. A sensor for remotely detecting an angular position of a shaft rotatable within a frame, comprising:
    a light source for generating a primary optical beam:
    first means operably coupled to receive said primary optical beam from said light source for generating collimated first, second, third, and polarized optical beams;
    a code wheel fixedly mounted to said shaft, said code wheel including first, second, and third channel mask patterns, a first polarizing filter, and a reference axis, said code wheel positioned proximate to said first means so that said first, second, and third mask patterns, and said polarizing filter transect said first, second, third, and polarized optical beams, respectively, said first, second, and third channel mask patterns and said first polarizing filter being concentric with respect to a spin axis of said wheel,
    said first channel mask pattern is a ring-shaped area comprising a 270 degree transparent arcuate segmented area extending +270 degrees from said reference axis, and a 90 degree opaque arcuate segmented area contiguous to said 270 degree transparent area, said second channel mask pattern is a ring-shaped area comprising a 180 degree transparent arcuate segmented area extending +180 degrees from said reference axis, and a 180 degree opaque arcuate segmented area contiguous to said 180 degree transparent area, and said third channel mask pattern is a ring-shaped area comprising a 90 degree transparent arcuate segmented area extending +90 degrees from said reference axis, and a 270 degree opaque arcuate segmented area contiguous to said 90 degree transparent area;

second means positioned proximate to said code wheel for receiving and combining said first, second, third, and polarized optical beams that are transmitted through said code wheel into a composite optical beam having an intensity; and third means operably coupled to receive said composite optical beam from said second means for providing an output corresponding to said angular position of said code wheel, said angular position being functionally related to said intensity of said composite optical beam.

2. The sensor of claim 1 wherein:

said polarized optical beam has a first polarization axis parallel to said reference axis of said code wheel when said code wheel is in a reference position;

said first polarizing filter has a second polarization axis, said second polarization axis being perpendicular to said first polarization axis when said code wheel is in said reference position.

3. The sensor of claim 2 wherein:

said first, second, third, and polarized optical beams are square wave modulated.

4. The sensor of claim 3 wherein:

said first means includes:

a first graded refractive index rod lens optically coupled to said light source and positioned to direct said first optical beam onto said first channel mask pattern;

a second graded refractive index rod lens optically coupled to said light source and positioned to direct said second optical beam onto said second channel mask pattern;

a third graded refractive index rod lens optically coupled to said light source and positioned to direct said third optical beam onto said third channel mask pattern;

a fourth graded refractive index rod lens optically coupled to said light source and positioned proximate to said code wheel to direct a fourth collimated optical beam;

a second polarization filter positioned between said fourth graded refractive lens and said first polarization filter of said code wheel to transect said fourth optical beam and to transform said fourth optical beam into said polarized optical beam; and said second means includes:

a fifth graded refractive index rod lens positioned to receive said first optical beam when said first optical beam passes through said first channel mask pattern;

a sixth graded refractive index rod lens positioned to receive said second optical beam when said second optical beam passes through said second channel mask pattern;

a seventh graded refractive index rod lens positioned to receive said third optical beam when said third optical beam passes through said third channel mask pattern;

an eighth graded refractive index rod lens positioned to receive said polarized optical beam when said polarized optical beam passes through said first polarization filter;

a 4×1 optical coupler optically coupled to said fifth, sixth, seventh, and eighth refractive index rod lenses for combining any of said first, second, third, and polarized optical beams that are transmitted through said code wheel into said composite optical beam having a waveform.

5. The sensor of claim 4 wherein;

said third means includes:

a first opto-electronic receiver having an input optically coupled to receive said composite light beam from said 4×1 optical coupler and an output for providing a first electrical output having a waveform analogous to said waveform of said composite light beam;

a second opto-electronic receiver having an input optically coupled to receive an optical intensity reference signal having a waveform from said first means and for providing a second electrical output having a waveform analogous to said waveform of said optical intensity reference signal;

a lock-in operably coupled to said first means to receive a modulation reference signal and operably coupled to receive said first and second electrical signals from said first and second opto-electronic receivers, respectively, and for providing said first and second electrical signals to said analog-to-digital converter in synchronization with said modulation reference signal;

an analog-to-digital converter operably coupled to receive said first and second electrical outputs from said lock-in in synchronization with said optical intensity reference signal and to provide a first digital output, $D_1$, functionally related to said first electrical output and a second digital output, $D_2$, functionally related to said second electrical output;

a ratio circuit operably coupled to receive said first and second digital outputs from said analog-to-digital converter, and for providing a normalized intensity output corresponding to $D_1/D_2$, said normalized intensity output functionally related to said angular position of said code wheel; and a memory storage device operably coupled to receive said normalized intensity output from said ratio circuit and having address cells for each storing a value corresponding to an angular position of said code wheel, said normalized intensity output corresponding to an address cell, said memory storage device providing a position output.

6. The sensor of claim 5 wherein said third means further includes:

a digital data processor operably coupled to receive said position output from said memory storage device.

7. The sensor of claim 5 wherein said third means further includes:
a display operably coupled to receive said position output from said memory storage device for displaying said angular position of said code wheel.

8. A sensor for remotely detecting an angular position of a shaft rotatable within a frame, comprising:
a light source for generating a primary optical beam having a modulation frequency;
first means operably coupled to receive said primary optical beam from said light source for providing collimated first, second, third, and polarized optical beams;
a code wheel fixedly mounted to said shaft, said code wheel including first, second, and third channel mask patterns, a first polarizing filter and a reference axis, said code wheel positioned proximate to said first means so that said first, second, and third mask patterns, and said polarizing filter transect said first, second, third, and polarized optical beams, respectively, said first, second, and third channel mask patterns and said first polarizing filter being concentric with respect to a spin axis of said wheel,
said first channel mask pattern is a ring-shaped area comprising a 270 degree transparent arcuate segmented area extending +270 degrees from said reference axis, and a 90 degree opaque arcuate segmented area contiguous to said 270 degree transparent area,
said second channel mask pattern is a ring-shaped area comprising a 180 degree transparent arcuate segmented area extending +180 degrees from said reference axis, and a 180 degree opaque arcuate segmented area contiguous to said 180 degree transparent area, and
said third channel mask pattern is a ring-shaped area comprising a 90 degree transparent arcuate segmented area extending +90 degrees from said reference axis, and a 270 degree opaque arcuate segmented area contiguous to said 90 degree transparent area;
a mirror positioned proximate to said code wheel so as to reflect said collimated first, second, third, and polarized optical beams that are transmitted through said code wheel back through said code wheel and into said first means;
second means operably coupled to receive said reflected collimated first, second, third, and polarized optical beams from said first means for providing an output corresponding to said angular position of said code wheel, said angular position being functionally related to a composite optical beam having a waveform comprising said reflected first, second, third, and polarized optical beams.

9. The sensor of claim 8 wherein:
said polarized optical beam has a first polarization axis parallel to said reference axis of said code wheel when said code wheel is in a reference position;
said first polarizing filter has a second polarization axis, said second polarization axis being perpendicular to said first polarization axis when said code wheel is in said reference position.

10. The sensor of claim 9 wherein:
said first, second, third, and polarized optical beams are square wave modulated.

11. The sensor of claim 10 wherein:
said first means includes:
a 2×2 optical coupler operably coupled to said light source;
a 1×2 optical coupler optically coupled to said 2×2 optical coupler;
a 1×3 optical coupler optically coupled to said 1×2 optical coupler;
a first graded refractive index rod lens directed towards said first channel mask pattern and optically coupled to said 1×3 optical coupler;
a second graded refractive index rod lens directed towards said second channel mask pattern and optically coupled to said 1×3 optical coupler;
a third graded refractive index rod lens directed towards said third channel mask pattern and optically coupled to said 1×3 optical coupler;
a fourth graded refractive index rod lens directed towards said first polarization filter and optically coupled to said 1×2 optical coupler; and
a second polarization filter positioned between said fourth graded refractive index rod lens and said first polarization filter of said code wheel.

12. The sensor of claim 11 wherein;
said second means includes:
a first opto-electronic receiver having an input optically coupled to said 2×2 optical coupler, said first opto-electronic receiver providing a first electrical output having a waveform analogous to said waveform of said composite optical beam;
a second opto-electronic receiver having an input optically coupled to said 2×2 optical coupler, said second opto-electronic receiver providing a second electrical output having a waveform functionally related to said primary optical beam;
a lock-in amplifier operably coupled to said first and second opto-electronic receivers, said lock-in amplifier providing said first and second electrical outputs in synchronization with said modulation frequency of said primary optical beam;
an analog-to-digital converter operably coupled to receive said first and second electrical outputs from said lock-in amplifier and to provide a first digital output, $D_1$, functionally related to said first electrical output and a second digital output, $D_2$, functionally related to said second electrical output;
a ratio circuit operably coupled to receive said first and second digital outputs from said analog-to-digital converter, and to provide a normalized intensity output corresponding to $D_1/D_2$, said normalized intensity output functionally related to said angular position of said code wheel; and
a memory storage device operably coupled to receive said normalized intensity output from said ratio circuit and having address cells for each storing a value corresponding to an angular position of said code wheel, said normalized intensity output corresponding to an address cell, said memory storage device providing a position output corresponding to said value.

13. The sensor of claim 12 wherein said third means further includes:
a digital data processor operably coupled to receive said value from said memory storage device.

14. The sensor of claim 12 wherein said third means further includes:
a display operably coupled to receive said value from said memory storage device for displaying said angular position of said code wheel.

* * * * *